United States Patent
Chen

(10) Patent No.: US 12,475,161 B2
(45) Date of Patent: Nov. 18, 2025

(54) MULTIMEDIA RESOURCE RECOMMENDATION METHOD AND APPARATUS

(71) Applicant: Tencent Technology (Shenzhen) Company Limited, Guangdong (CN)

(72) Inventor: Hao Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 28 days.

(21) Appl. No.: 18/315,200

(22) Filed: May 10, 2023

(65) Prior Publication Data

US 2023/0273951 A1    Aug. 31, 2023

Related U.S. Application Data

(63) Continuation of application No. PCT/CN2022/097098, filed on Jun. 6, 2022.

(30) Foreign Application Priority Data

Jun. 17, 2021 (CN) .......................... 202110675393.6
Dec. 30, 2021 (CN) .......................... 202111680341.4

(51) Int. Cl.
G06F 16/45 (2019.01)
G06F 16/483 (2019.01)

(52) U.S. Cl.
CPC ............ G06F 16/45 (2019.01); G06F 16/483 (2019.01)

(58) Field of Classification Search
CPC .... G06F 16/45; G06F 16/483; G06F 16/9535; G06F 16/435; Y02D 10/00; G06N 20/00
(Continued)

(56) References Cited

U.S. PATENT DOCUMENTS 6,460,036 B1 * 10/2002 Herz .................. H04N 21/4755
                                                                348/E7.071
11,004,135 B1 *  5/2021 Sandler .............. G06Q 30/0631
(Continued)

FOREIGN PATENT DOCUMENTS

CN    110175245 A    8/2019
CN    111104599 A    5/2020
(Continued)

OTHER PUBLICATIONS

International Search Report of PCT/CN2022/097098 dated Jul. 29, 2022 [PCT/ISA/210].
(Continued)

Primary Examiner — Mark E Hershley
Assistant Examiner — Antonio J Caiado
(74) Attorney, Agent, or Firm — Sughrue Mion, PLLC

(57) ABSTRACT

A multimedia resource recommendation method and apparatus includes: acquiring a representation vector of a target object and an adjacent object representation vector set; determining, based on the representation vector of the target object and the adjacent object representation vector set, representation feature information of the target object, the representation feature information being determined based on relationship feature information corresponding to each first relationship type of K first relationship types of the target object and adjacent objects; and acquiring a multimedia resource set, determining, based on the representation feature information of the target object, a first multimedia resource from the multimedia resource set, and transmitting the first multimedia resource to the target object, the first multimedia resource being one or more multimedia resources having a matching degree with the representation feature information of the target object higher than a matching degree threshold.

19 Claims, 7 Drawing Sheets

(58) Field of Classification Search
USPC ........................................................ 707/706
See application file for complete search history.

(56) References Cited

U.S. PATENT DOCUMENTS

| | | | |
|---|---|---|---|
| 11,100,368 B2* | 8/2021 | Chu | G06V 10/764 |
| 11,416,714 B2* | 8/2022 | Smith | G06V 10/451 |
| 11,586,941 B2* | 2/2023 | Yu | G06F 16/9535 |
| 2014/0207582 A1* | 7/2014 | Flinn | G06N 20/00 |
| | | | 705/14.66 |
| 2017/0091319 A1* | 3/2017 | Legrand | G06F 16/93 |
| 2019/0114373 A1* | 4/2019 | Subbian | G06F 16/9536 |
| 2019/0332935 A1 | 10/2019 | Sanchez Bermudez et al. | |
| 2020/0034431 A1* | 1/2020 | Zhou | G06F 40/30 |
| 2020/0272913 A1 | 8/2020 | Yu et al. | |
| 2020/0327378 A1 | 10/2020 | Smith et al. | |
| 2022/0014807 A1* | 1/2022 | Lin | G06N 3/044 |
| 2022/0019750 A1* | 1/2022 | Ravichandran | G06F 40/20 |
| 2022/0083874 A1* | 3/2022 | Bian | G06N 5/022 |
| 2022/0239988 A1* | 7/2022 | Yang | H04N 21/4725 |
| 2023/0095947 A1* | 3/2023 | Liu | H04L 67/535 |
| | | | 707/722 |
| 2023/0140681 A1* | 5/2023 | Wu | G06F 16/483 |
| | | | 707/706 |
| 2023/0306035 A1* | 9/2023 | Zhou | G06F 16/2264 |

FOREIGN PATENT DOCUMENTS

| | | | | | |
|---|---|---|---|---|---|
| CN | 111400514 | A | | 7/2020 | |
| CN | 111563187 | A | * | 8/2020 | ............. G06N 20/00 |
| CN | 112085293 | A | * | 12/2020 | ............. G06N 20/00 |
| CN | 112395435 | A | | 2/2021 | |
| CN | 113434769 | A | * | 9/2021 | ............. G06N 20/00 |
| CN | 116049566 | A | * | 5/2023 | ............. G06N 20/00 |
| CN | 117997858 | A | * | 5/2024 | ............. G06N 20/00 |
| CN | 118646655 | A | * | 9/2024 | ............. G06N 20/00 |
| WO | 2020/190112 | A1 | | 9/2020 | |

OTHER PUBLICATIONS

Written Opinion of PCT/CN2022/097098 dated Jul. 29, 2022 [PCT/ISA/237].
Communication from Chinese Patent Office dated May 29, 2025 in Application No. 202111680341.4.

* cited by examiner

MULTIMEDIA RESOURCE RECOMMENDATION METHOD AND APPARATUS

CROSS REFERENCE TO RELATED APPLICATIONS

This application is a continuation of PCT/CN2022/097098 filed on Jun. 6, 2022 and claims priority to Chinese Patent Application No. 202110675393.6, filed with the China National Intellectual Property Administration on Jun. 17, 2021, and Chinese Patent Application No. 202111680341.4, filed with the China National Intellectual Property Administration on Dec. 30, 2021, the contents of each of which are incorporated by reference herein in their entireties.

FIELD

Embodiments of the disclosure relate to the field of computers, and relate to, but is not limited to, a multimedia resource recommendation method and apparatus.

BACKGROUND

With the development of computer technology, a huge amount of multimedia resources have emerged in the network. At present, most recommendation algorithms for multimedia resources are not accurate enough to perform such operations as multimedia recommendation, and the matching degree is low.

SUMMARY

Embodiments of the disclosure provide a multimedia resource recommendation method and apparatus, a device, a storage medium, and a computer program product, which may better improve the accuracy of recommendation.

An embodiment of this application provides a multimedia resource recommendation method. The method is applied to an electronic device, and includes acquiring a representation vector of a target object and an adjacent object representation vector set, the adjacent object representation vector set including representation vectors of first adjacent objects of the target object, the target object and the first adjacent objects being divided into K first relationship types, K being a positive integer. The method further includes obtaining, based on the representation vector of the target object and the adjacent object representation vector set, representation feature information of the target object, the representation feature information being determined based on relationship feature information corresponding to each first relationship type of the K first relationship types of the target object and acquiring a multimedia resource set, determining, based on the representation feature information of the target object, a first multimedia resource from the multimedia resource set, and transmitting the first multimedia resource to the target object, the first multimedia resource being one or more multimedia resources having a matching degree with the representation feature information of the target object higher than a matching degree threshold.

According to other aspects of one or more embodiments, there is also provided an apparatus and non-transitory computer readable medium consistent with the method.

BRIEF DESCRIPTION OF THE DRAWINGS

To describe the technical solutions in the example embodiments of the disclosure more clearly, the following briefly introduces the accompanying drawings required for describing the example embodiments. The accompanying drawings in the following description show merely some embodiments of the disclosure, and a person of ordinary skill in the art may still derive other accompanying drawings from the accompanying drawings without creative efforts. In addition, one of ordinary skill would understand that aspects of example embodiments may be combined together or implemented alone.

DETAILED DESCRIPTION

The technical solutions according to the embodiments of the disclosure will be described clearly and completely below with reference to the accompanying drawings according to some embodiments.

Exemplary embodiments are described in detail herein, and examples thereof are shown in the accompanying drawings. When the following descriptions are made with reference to the accompanying drawings, unless otherwise indicated, the same numbers in different accompanying drawings represent the same or similar elements. The following implementations described in the following exemplary embodiments do not represent all implementations that are consistent with the disclosure. Instead, they are merely examples of apparatuses and methods consistent with some aspects of the disclosure as recited in the appended claims.

The embodiments of the disclosure relate to artificial intelligence (AI) and machine learning (ML). An electronic device (also referred to as an intelligent device) according to some embodiments is capable of recommending multimedia resources to a target object based on relationship types between the target object and adjacent objects of the target object.

According to some embodiments, in the process of constructing an association information network graph, one or more artificial intelligence software technologies may be involved when an interaction behavior between objects is converted into edge information. For example, computer vision technology may be involved in extracting features of (short) videos sent between the objects; speech processing technology may be involved in extracting features of speech sent between the objects; and natural language processing technology may be involved in extracting features of textual information sent between the objects.

Furthermore, some embodiments may also relate to artificial intelligence cloud services and blockchain. Some embodiments mainly relate to recommendation of multimedia resources to an object via a multimedia recommendation platform (namely, the artificial intelligence cloud services).

According to some embodiments, the intelligent device may acquire association relationships between objects from a blockchain network, and then recommend multimedia resources to the target object based on reliable association relationships. Representation feature information of the objects and resource feature information of multimedia resources obtained through analysis may be uploaded to the blockchain for subsequent use. For example, resource feature information of a certain multimedia resource may need to match representation feature information of a plurality of objects within a period of time, so that by uploading the resource feature information of the multimedia resource to the blockchain, other network nodes assisting in multimedia resource recommendation may directly use the multimedia resource for recommendation.

Figure 1:
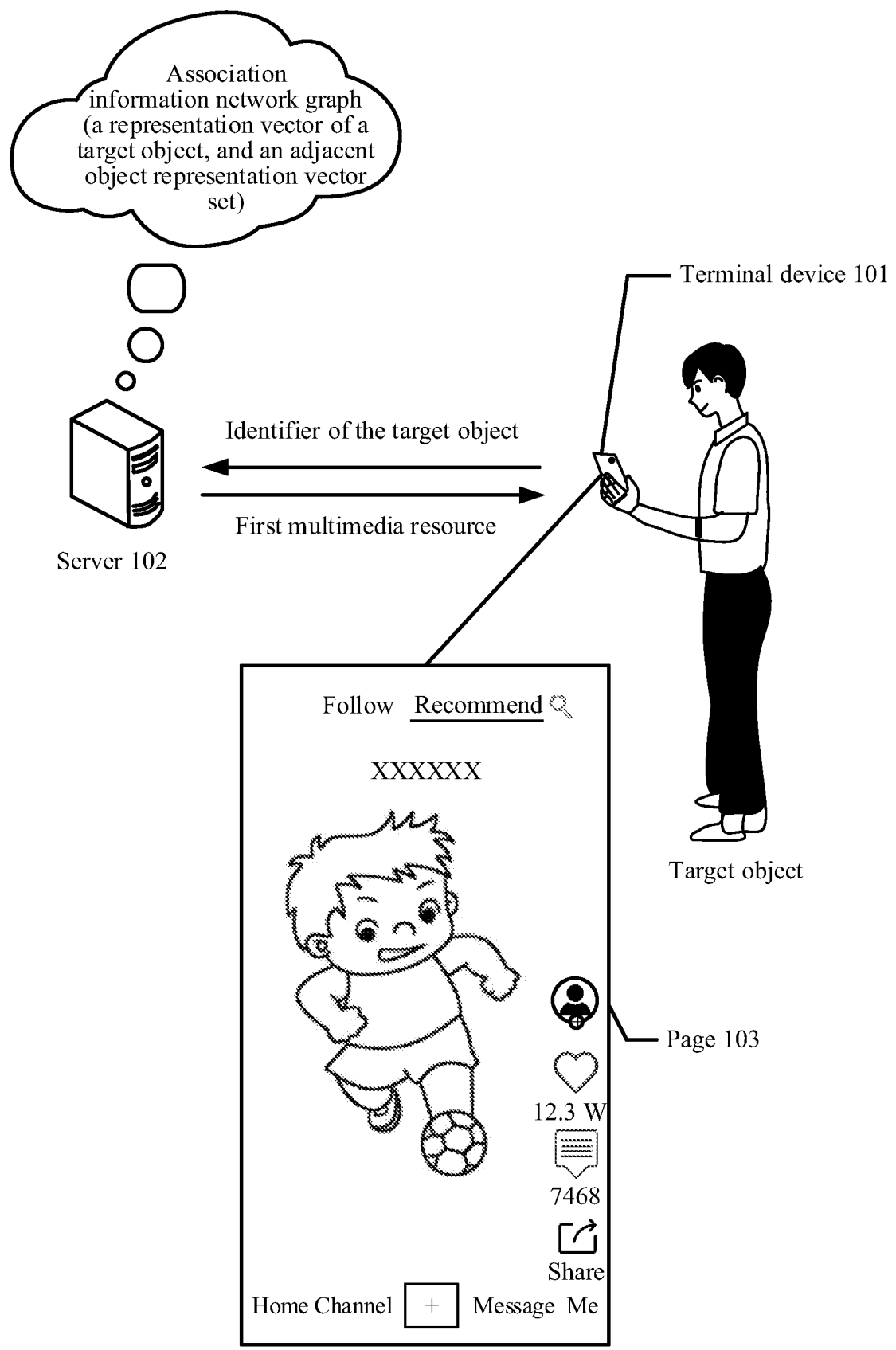
FIG. 1 illustrates a multimedia resource recommendation scenario according to some embodiments.

FIG. 1 illustrates a multimedia resource recommendation scenario according some embodiments. As shown in FIG. 1, the multimedia resource recommendation scenario includes a terminal device 101 and a server 102. The terminal device 101 is a device used by the target object. The terminal device 101 may include, but is not limited to: smartphones (such as Android mobile phones and iOS mobile phones), tablet computers, portable personal computers, mobile Internet devices (MIDs), etc. The terminal device is equipped with a display apparatus which may also be a monitor, a display screen, a touch panel, and the like, and the touch panel may also be a touch screen, a touch pad, and the like, which is not limited by the embodiments of the disclosure.

The server 102 refers to a background device capable of making a personalized multimedia resource recommendation based on an identifier of the target object sent by the terminal device 101. After determining, based on the identifier of the target object sent by the terminal device 101, a first multimedia resource to be recommended to the target object, the server 102 may return the first multimedia resource to the terminal device 101. A page 103 is a schematic page of the terminal device 101 to display the first multimedia resource transmitted by the server 102 according to the disclosure. The server 102 may be an independent physical server, or a server cluster or distributed system formed by a plurality of physical servers, or a cloud server that provides cloud services, cloud databases, cloud computing, cloud functions, cloud storage, network services, cloud communication, middleware services, domain name services, security services, CDN, big data and artificial intelligence platforms, and other basic cloud computing services. Moreover, a plurality of servers may be organized into a blockchain network, with each server being a node in the blockchain network. The terminal device 101 and the server 102 may be directly or indirectly connected through wired communication or wireless communication, which is not limited by this application herein.

According to some embodiments, the multimedia resource may be a video resource, an audio resource, an image resource, etc. According to some embodiments, the multimedia resource is a video resource. A video watching application (App) may be installed in the terminal 101. After the terminal transmits the identifier of the target object to the server 102 upon receiving an operation instruction to start the video watching App, the server 102 acquires a representation vector of the target object and an adjacent object representation vector set based on the identifier of the target object, and determines the representation feature information of the target object, where the representation feature information integrates the representation vectors of the target object and the first adjacent objects having the interaction behavior with the target object; and the server 102 determines one or more target videos having the highest matching degree with the representation feature information of the target object from a plurality of videos, and transmits the same to the terminal 101. The terminal 101 may present the target video on the home page after starting the video watching App. That is, the server 102 mines the interest points of a target user based on relationship types between the target user and adjacent users of the target user, which is more accurate than mining the interest points of users based on history records, thereby improving the accuracy of video recommendation.

The quantity of terminal devices and servers in the multimedia resource recommendation scenario shown in FIG. 1 is merely an example, for example, there may be a plurality of terminal devices and servers, which is not limited by the disclosure.

According to some embodiments, the multimedia resource recommendation scenario may also merely include a terminal device 101 equipped with a multimedia resource recommendation apparatus. After an object opens the multimedia platform, the terminal device 101 recommends multimedia resources to the target object via the multimedia resource recommendation apparatus carried thereon, for example, displaying the recommended multimedia resources in the interface 103.

Related data such as object information, multimedia information, interaction behaviors of objects, etc. involved in the specific implementation of the disclosure need to be subject to object permission or consent when the above-mentioned embodiments of the disclosure are applied to a specific product or technology, and the collection, use and processing of the related data shall comply with relevant laws, regulations and standards of relevant countries and regions.

In the multimedia resource recommendation scenario shown in FIG. 1, the multimedia resource recommendation process mainly includes the following operations:

(1) The server 102 acquires a representation vector of a target object and an adjacent object representation vector set. According to some embodiments, the server 102 acquires the representation vector of the target object and the adjacent object representation vector set based on an association information network graph, the association information network graph being constructed based on interaction behaviors of various objects on a social platform. The adjacent object representation vector set includes representation vectors of first adjacent objects of the target object. The first adjacent objects refer to objects having an interaction behavior with the target object. Similarly, second adjacent objects refer to objects having an interaction behavior with the first adjacent objects of the target object, but having no interaction behavior with the target object. Further, the target object and the first adjacent objects are divided into K first relationship types, K being a positive integer.

(2) The server 102 obtains representation feature information of the target object based on the representation vector of the target object and the adjacent object representation vector set, the representation feature information being determined based on relationship feature information corresponding to each first relationship type of the K first relationship types of the target object. According to some embodiments, the server 102 obtains the relationship feature information corresponding to each first relationship type of the K first relationship types based on the representation vector of the target object and the adjacent object representation vector set, that is, the relationship feature information corresponding to the first relationship types is determined based on the representation vector of the target object and representation vectors of the adjacent objects. The target object is represented through K relationship feature information respectively corresponding to the K first relationship types, so as to obtain the representation feature information of the target object. That is, the representation feature information of the target object is represented jointly by the K relationship feature information respectively corresponding to the K first relationship types, that is, the representation feature information of the target object is obtained based on the relationship types between the target object and the adjacent objects of the target object.

(3) The server 102 acquires a multimedia resource set, and recommends a first multimedia resource (one or more multimedia resources, having a matching degree with the representation feature information of the target object higher than a matching degree threshold, in the multimedia resource set, that is, a multimedia resource most likely to interest in the target object) in the multimedia resource set to the target object based on the representation feature information of the target object. According to some embodiments, the resource feature information of each multimedia resource in the multimedia resource set is obtained based on representation vectors of objects that have clicked/tapped the multimedia resource.

According to some embodiments, the representation vector of the target object and the adjacent object representation vector set are acquired, the representation feature information of the target object is obtained based on the representation vector of the target object and the adjacent object representation vector set, the representation feature information being determined based on the relationship feature information corresponding to each first relationship type of the K first relationship types between the target object and the adjacent objects, the multimedia resource set is acquired, and the first multimedia resource in the multimedia resource set is recommended to the target object based on the representation feature information of the target object. Thus, the interest points of the target object are mined based on the relationship types between the target object and the adjacent objects of the target object, and the accuracy of recommendation is improved.

Figure 2:
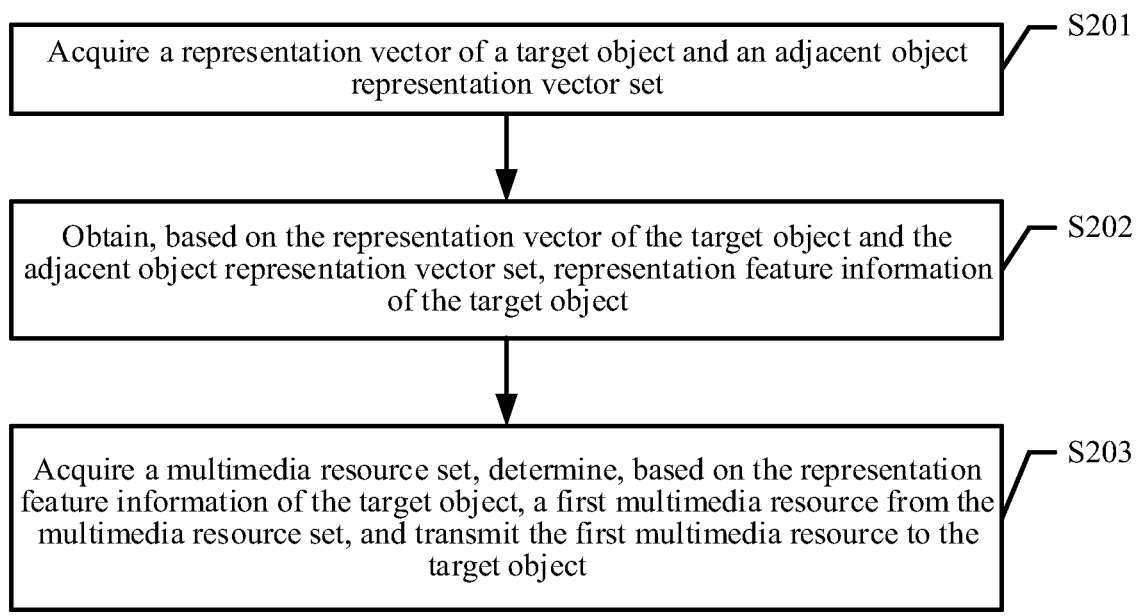
FIG. 2 is a schematic flowchart of a multimedia resource recommendation method according to some embodiments.

FIG. 2 is a schematic flowchart of a multimedia resource recommendation method according to an embodiment of the disclosure. The method according to some embodiments is applied to an intelligent device. The intelligent device may be, for example, some of the above-mentioned terminal devices used by objects, or some servers with special functions. The operations of the multimedia resource recommendation method according to some embodiments are described below with reference to FIG. 2.

S201: Acquire a representation vector of a target object and an adjacent object representation vector set.

The adjacent object representation vector set includes representation vectors of first adjacent objects of the target object. The first adjacent objects refer to objects having an interaction behavior with the target object. Second adjacent objects refer to objects having an interaction behavior with the first adjacent objects of the target object, but having no interaction behavior with the target object.

In one implementation, a server acquires the representation vector of the target object and the adjacent object representation vector set based on an association information network graph, and the association information network graph is constructed based on interaction behaviors between various objects on a social platform. The interaction behaviors include, but are not limited to, instant messaging chat, file sharing, and picture sharing. The target object and the first adjacent objects are divided into K first relationship types, K being a positive integer. The division of the K first relationship types may be set according to actual requirements. For example, the K first relationship types may be divided based on an association relationship, or cumulative duration of the interaction behaviors, or the time of a first interaction behavior between the target object and the first adjacent objects, etc.

S202: Obtain, based on the representation vector of the target object and the adjacent object representation vector set, representation feature information of the target object.

The representation feature information of the target object is determined based on relationship feature information corresponding to each first relationship type of the K first relationship types of the target object.

The representation vector of the target object is used for representing features of the target object. According to some embodiments, the representation vector of the target object may be obtained based on object feature information carried by the target object, or may be obtained based on the representation vectors of the first adjacent objects of the target object, or may be obtained based on representation vectors of the first adjacent object to an $S^{th}$ adjacent object of the target object, S being a positive integer. S is proportional to the amount of the object feature information carried by the representation vector of the target object. Similarly, in the adjacent object representation vector set, the representation vector of each first adjacent object of the target object may be obtained based on object feature information carried by the first adjacent object, or may be obtained based on a representation vector of a first adjacent object of the first adjacent object, or may be obtained based on representation vectors of the first adjacent object to an $S^{th}$ adjacent object of the first adjacent object.

The representation feature information of the target object may be a feature vector or a feature matrix, and the representation feature information of the target object carries the object feature information of the target object. In one implementation, the server obtains the relationship feature information corresponding to each first relationship type of the K first relationship types based on the representation vector of the target object and the adjacent object representation vector set, for example, the relationship feature information corresponding to each first relationship type is determined based on the representation vector of the target object and representation vectors of the adjacent objects. After obtaining the relationship feature information corresponding to each first relationship type of the K first relationship types, the server uses K relationship feature information respectively corresponding to the K first relationship types to represent the target object, so as to obtain the representation feature information of the target object. That is, the representation feature information of the target object is represented jointly by the K relationship feature information respectively corresponding to the K first relationship types, that is, the representation feature information of the target object is obtained based on the relationship types between the target object and the adjacent objects of the target object.

S203: Acquire a multimedia resource set, determine, based on the representation feature information of the target object, a first multimedia resource from the multimedia resource set, and transmit the first multimedia resource to the target object.

The first multimedia resource is one or more multimedia resources having a matching degree with the representation feature information of the target object higher than a matching degree threshold. The multimedia resource set may be preset, or may be updated in real time by a multimedia resource platform based on multimedia resources in a database.

In one implementation, resource feature information of each multimedia resource in the multimedia resource set is obtained based on representation vectors of objects that have viewed the multimedia resource. The server recommends the first multimedia resource in the multimedia resource set to the target object based on the representation feature information of the target object and the resource feature information of each multimedia resource in the multimedia resource set. The first multimedia resource is one or more multimedia resources, having the matching degree with the representation feature information of the target object higher than the matching degree threshold, in the multimedia resource set, namely a multimedia resource that is most likely to interest the target object.

According to some embodiments, when it is necessary to determine the first multimedia resource to be recommended to the target object, firstly, the representation vector of the target object and the adjacent object representation vector set are acquired, the adjacent object representation vector set including the representation vectors of the first adjacent objects having the interaction behavior with the target object, the target object and the first adjacent objects being divided into the K first relationship types; then the representation feature information of the target object is obtained based on the representation vector of the target object and the adjacent object representation vector set, and the representation feature information of the target object is determined based on the relationship feature information corresponding to each first relationship type of the K first relationship types between the target object and the adjacent objects, such that the representation feature information of the target object integrates the representation vectors of the target object and the first adjacent objects having the interaction behavior with the target object; and finally, the multimedia resource set is acquired, the first multimedia resource is determined from the multimedia resource set based on the representation feature information of the target object, and the first multimedia resource is transmitted to the target object. Since the first multimedia resource is determined from the multimedia resource set based on the representation feature information of the target object, and the first multimedia resource is one or more multimedia resources having the matching degree with the representation feature information of the target object higher than the matching degree threshold, interest points of the target object may be mined more accurately and comprehensively based on the relationship types between the target object and the adjacent objects of the target object, thereby improving the accuracy of recommendation.

Figure 3:
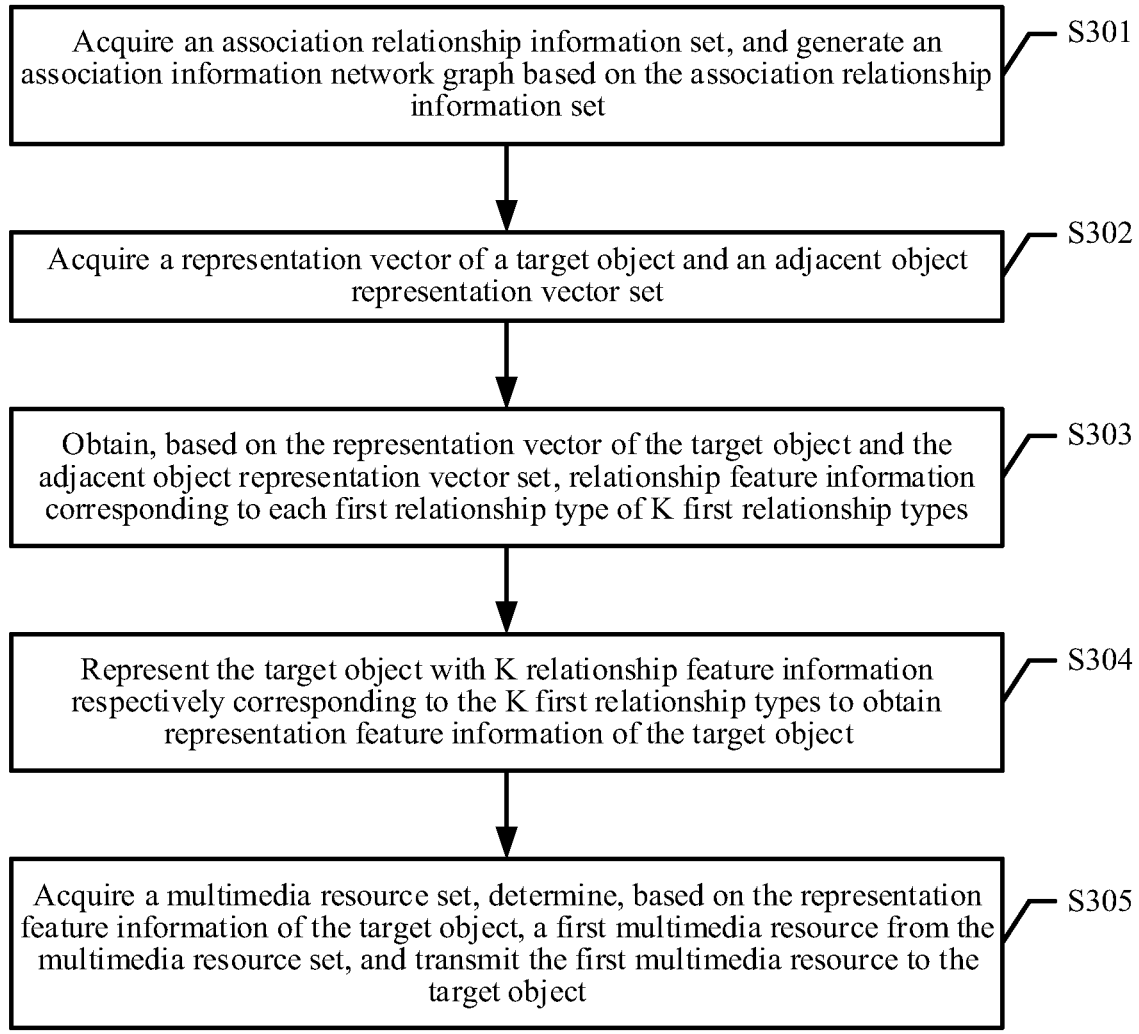
FIG. 3 is a schematic flowchart of another multimedia resource recommendation method according to some embodiments.

FIG. 3 is a schematic flowchart of another multimedia resource recommendation method according to some embodiments. The method according to some embodiments is applied to an intelligent device. The intelligent device may be, for example, some of the above-mentioned terminal devices used by objects, or some servers with special functions. The method includes the following operations:

S301: Acquire an association relationship information set, and generate, based on the association relationship information set, an association information network graph.

The association relationship information set includes an object information set and a relationship information set.

In one implementation, the intelligent device generates N network nodes based on the object information set, each network node of the N network nodes corresponds to an object, and each network node carries object information of the corresponding object, N being a positive integer. An edge between the network nodes is determined based on an interaction behavior between the objects corresponding to the network nodes. In a case that the relationship information set indicates that an object corresponding to a first network node of the N network nodes and an object corresponding to a second network node have an interaction behavior, edge information of the first network node and the second network node is generated based on the interaction behavior to obtain the association information network graph.

Further, the intelligent device may determine a weight of each edge in the association information network graph based on the relationship information set. According to some embodiments, an edge weight in the edge information of the first network node and second network node includes: a weight determined based on an association degree between the first network node and the second network node. The edge weight is proportional to the association degree. The association degree is determined based on interaction information of the first network node and the second network node within a target period of time. The interaction information includes: at least one of cumulative quantity of interactions, cumulative duration of interactions, and the frequency of interactions.

According to some embodiments, firstly, an object association information network graph is defined as G=(A, X), where N denotes the quantity of all objects, A denotes an object association matrix, and X denotes object feature information. Generally, the object association matrix A needs to include various information such as the quantity of object chats, the frequency of object chats, the frequency of interactions and other behavior features. The intelligent device connects the corresponding network nodes of the objects into the object association information network graph based on historical behaviors of the objects, and edges between the objects is determined by the association degree between the objects. If two objects have a lot of interaction behaviors, a weight of a connecting line between the two objects is high, and if two objects have few interaction behaviors, a weight of a connecting line between the two objects is low. If two objects have no interaction behavior, the two objects have no connecting line there between. The interaction behavior between the objects may be determined jointly by the variables such as the quantity of interaction behaviors between the objects, the cumulative duration of interaction behaviors, the order of interaction frequencies, and the quantity of interaction days within the target period of time.

Figure 4A:
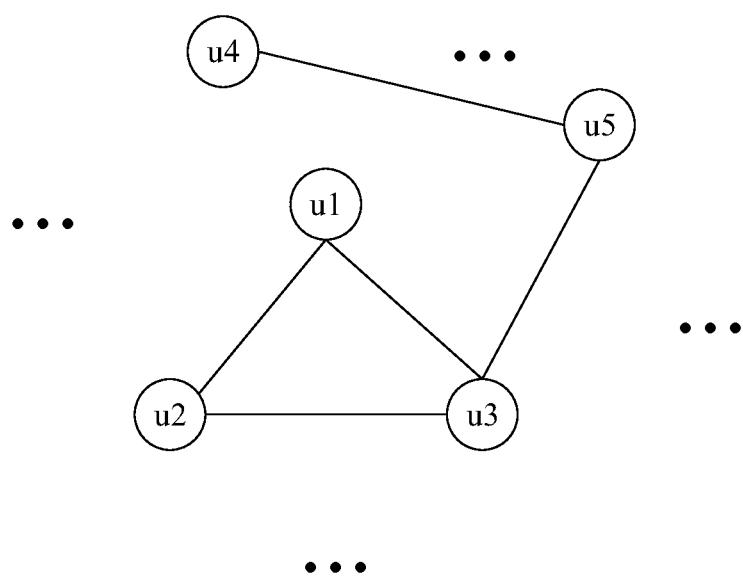
FIG. 4a is a schematic diagram of an object association information network graph according to some embodiments.

FIG. 4a is a schematic diagram of the object association information network graph according to some embodiments. As shown in FIG. 4a, assuming that the quantity of interactions between objects corresponding to network nodes u1 and u2 is high and the quantity of interactions between objects corresponding to network nodes u1 and u3 is low, a weight of a connecting line between the network nodes u1 and u2 is higher than a weight of a connecting line between the network nodes u1 and u3. Assuming that the object corresponding to the network node u1 has no interaction with other objects except the objects corresponding to the network nodes u2 and u3, u1 has no connecting line with other network nodes. In addition, to better describe the association degree between an object i and an object j, the quantity of interactions between the two objects may be denoted as $c_{ij}$, and thus the relationship between the object i and the object j may be expressed as: $\log(1+c_{ij})$. That is, in the object association matrix A, $A_{ij}=\log(1+c_{ij})$.

Furthermore, after obtaining the association information network graph, the intelligent device obtains representation vectors (that is, describing each object by vectors) of the N objects corresponding to the N network nodes based on the association information network graph. The purpose is to describe the interaction behavior between objects by vectors, so that vector representations of objects with close association relationships are similar; and accordingly, vector representations of objects with distant association relationships are different. In one example, based on the association information network graph, random walk is performed in the association information network graph with a target network node corresponding to a target object as a starting point, so as to obtain M tracks, a stride of each track being P, M and P being positive integers. A representation vector of the target object is obtained based on object information carried in the M tracks. The probability of walking from an $i^{th}$ network node to a $j^{th}$ network node is proportional to a target edge weight, and the target edge weight is an edge weight in edge information of the $i^{th}$ network node and the $j^{th}$ network node, where i and j are positive integers, i is not equal to j, and i and j are less than or equal to N. That is, the larger $A_{ij}$, the higher the probability of walking from the $i^{th}$ network node to the $j^{th}$ network node.

According to some embodiments, the intelligent device represents an object by a vectorized embedding method, etc., and common vectorized embedding methods include an unsupervised object embedding method, such as Node2Vec node embedding. Taking the Node2Vec node embedding method as an example, based on the association information network graph, random walk is performed from the target network node in the graph to obtain a plurality of trajectories. Afterwards, all trajectories obtained by the walk are input as a corpus into a word2vec word vector embedding algorithm model. By processing the corpus with the word2vec word vector embedding algorithm model, the representation vector of the target object corresponding to the target network node is obtained. Since weights of connecting lines between network nodes corresponding to different objects in the graph are different, weighted random walk (that is the probability of walking from the $i^{th}$ network node to the $j^{th}$ network node is proportional to Ail) may be used during vectorized embedding considering the influence of weights. Similarly, with the above-mentioned method, the intelligent device may obtain a matrix formed by representation vectors of objects corresponding to all nodes in the association information network graph. The matrix is denoted as X, and $X=\{x_1, x_2, \ldots, x_N\}$, where $x_i$ denotes a representation vector of the $i^{th}$ object.

S302: Acquire the representation vector of the target object and an adjacent object representation vector set.

In one implementation, after obtaining the matrix X formed by the representation vectors of the objects corresponding to all nodes in the association information network graph, the intelligent device may obtain the representation vector of the target object and the adjacent object representation vector set from the matrix X.

S303: Obtain, based on the representation vector of the target object and the adjacent object representation vector set, relationship feature information corresponding to each first relationship type of the K first relationship types.

Figure 4B:
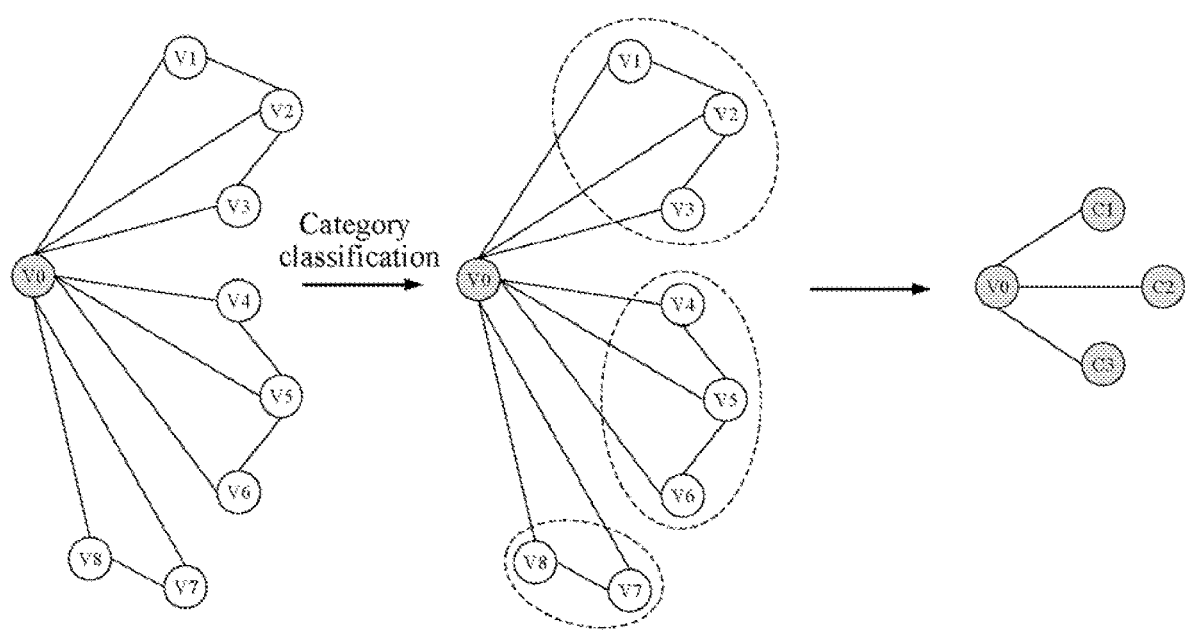
FIG. 4b is a schematic diagram of a graph convolutional model based on an association information network graph according to some embodiments.

FIG. 4b is a schematic diagram of a graph convolutional model based on the association information network graph according to some embodiments. As shown in FIG. 4b, V0 denotes the target network node corresponding to the target object, and V1 to V8 denote network nodes corresponding to first adjacent objects of the target object. In one implementation, V1 to V8 have the same aggregation weight and the same mapping function, which simply means that V1 to V8 are considered to have the same influence on V0 regardless of the association degree between V1 to V8 and V0.

In another implementation, since V1 to V8 are objects with which V0 establishes association relationships in different ways, and have different influences on the target object (e.g. adjacent objects with a higher frequency of interactions have a higher influence on the target object), V1 to V8 may not be simply considered to have the same influences on V0. Therefore, different objects need to be classified (e.g., dividing the objects into a plurality of categories based on factors such as the reason for establishing a connection, the relationship type, the cumulative duration of the association relationship, and the frequency of interactions). In practice, it is generally difficult to directly acquire the reasons for the formation of association relationships in practical applications.

According to some embodiments, the intelligent device divides the first adjacent objects of the target object into K first relationship types according to predetermined rules, and obtains a feature parameter set of an $h^{th}$ first relationship type of the K first relationship types. The feature parameter set includes a weight matrix of the $h^{th}$ first relationship type and a bias vector of the $h^{th}$ first relationship type (e.g., initializing the weight matrix $W_h$ of the $h^{th}$ first relationship type and the bias vector $b_h$ of the $h^{th}$ first relationship type according to predetermined rules). For example, the weight matrix $W_h$ of the $h^{th}$ first relationship type and the bias vector $b_h$ of the $h^{th}$ first relationship type are randomly initialized, and the weight matrix $W_h$ of the $h^{th}$ first relationship type and the bias vector $b_h$ of the $h^{th}$ first relationship type are updated by gradient descent in the training process, so as to finally obtain an updated weight matrix $W_h$ of the $h^{th}$ first relationship type and an updated bias vector $b_h$ of the $h^{th}$ first relationship type. Similarly, the intelligent device may obtain a weight matrix and bias vector of each first relationship type based on the above-mentioned method.

Further, a target object intermediate feature (namely, an implicit representation of the target object) of the target object under the $h^{th}$ first relationship type and an adjacent object intermediate feature (namely, an implicit representation of the first adjacent objects) of each first adjacent object of the target object under the $h^{th}$ first relationship type are calculated based on the feature parameter set of the $h^{th}$ first relationship type. An implicit representation $z_{i,h}$ of the object i in the $h^{th}$ first relationship type may be expressed as:

$$z_{i,h} = \frac{\sigma(W_h^T x_i + b_h)}{\|\sigma(W_h^T x_i + b_h)\|_2}, \quad \text{Equation 1}$$

where $\|x\|_2$ denotes to calculate a modal length of x, the operation of division by the modal length being for the purpose of getting rid of the influence of the vector length on classification; σ(x) is an activation function (such as a sigmoid function, a tan h function, and a Relu function); $W_h^T$ denotes a transposed matrix of the weight matrix $W_h$ of the $h^{th}$ first relationship type; $x_i$ denotes the representation vector (which may be obtained from the matrix X in operation S301) of the object i; and $b_h$ denotes the bias vector of the $h^{th}$ first relationship type. Based on Equation 1 above, the intelligent device may determine the implicit representations of the target object and the first adjacent objects of the target object.

According to some embodiments, after determining the implicit representations of the target object and the first adjacent objects of the target object, the intelligent device obtains relationship feature information $c_h$ of the $h^{th}$ first relationship type based on the implicit representations of the target object and the first adjacent objects of the target object, which may be expressed as:

$$c_h = \frac{z_{u,h} + \sum_{(v|(u,v)\in G)} p_{v,h}^{(t-1)} z_{v,h}}{\left\| z_{u,h} + \sum_{(v|(u,v)\in G)} p_{v,h}^{(t-1)} z_{v,h} \right\|_2}, \quad \text{Equation 2}$$

where a network node u corresponds to V0 (that is, the network node corresponding to the target object) in FIG. 4b, (v|(u, v)∈ G) corresponds to V1 to V8 (that is, the network nodes corresponding to the first adjacent objects of the target object) in FIG. 4b, $p_{v,h}$ denotes the probability that an object v is classified as the $h^{th}$ first relationship type, $p_{v,h} \geq 0$, $\Sigma_1^K p_{v,h} = 1$, $z_{u,h}$ denotes the implicit representation of the target object under the $h^{th}$ first relationship type, and $z_{v,h}$ denotes the implicit representations of the first adjacent objects of the target object under the $h^{th}$ first relationship type. The value of $p_{v,h}$ is determined based on the quantity of the first relationship types. In one specific implementation, $$p_{v,h} = \frac{1}{K}.$$

For example, assuming that the quantity of the first relationship types of an object A is 5 (that is, association relationships of the object A are divided into 5 categories)

$$p_{v,h} = \frac{1}{5}.$$

based on Equation 2 above, the intelligent device may determine relationship feature information of the K first relationship types.

In another embodiment, the relationship feature information of the $h^{th}$ first relationship type is relationship feature information of the $h^{th}$ first relationship type at a $T^{th}$ iteration, T being a positive integer greater than 1. The intelligent device acquires a target probability $p_{v,h}^{(t)}$ that each first adjacent object of the target object is classified as the $h^{th}$ first relationship type at a $t^{th}$ iteration, t being a positive integer, t being less than T. Then the intelligent device calculates an aggregation feature $\Sigma_{(v|(u,v)\in G)} p_{v,h}^{(t-1)} z_{v,h}$ of each first adjacent object of the target object based on the target probability $p_{v,h}^{(t)}$, and the intermediate feature (that is, the implicit representation $z_{v,h}$ of the first adjacent objects) of each adjacent object of the target object. Operation processing is performed on the target object intermediate feature (that is, the implicit representation $z_{u,h}$ of the target object) and the aggregation features of the first adjacent objects of the target object to obtain relationship feature information of the $h^{th}$ first relationship type at a $(t+1)^{th}$ iteration. The target probability may be expressed as:

$$p_{v,h}^{(t)} = \frac{\exp(z_{v,h}^T c_h^{(t)})}{\sum_1^K \exp(z_1^T c_h^{(t)})}, \quad \text{Equation 3}$$

where the exponential function exp(x) denotes to calculate an exponent of x, $z_{v,h}^T$ is a transposed matrix of $z_{v,h}$, and $c_h^{(t)}$ denotes the relationship feature information of the $h^{th}$ first relationship type at the $t^{th}$ iteration. $c_h^{(t)}$ may be expressed as:

$$c_h^{(t)} = \frac{z_{u,h} + \sum_{(v|(u,v)\in G)} p_{v,h}^{(t-1)} z_{v,h}}{\left\| z_{u,h} + \sum_{(v|(u,v)\in G)} p_{v,h}^{(t-1)} z_{v,h} \right\|_2}, \quad \text{Equation 4}$$

where the network node u corresponds to V0 (that is, the network node corresponding to the target object) in FIG. 4b, (v|(u, v)∈ G) corresponds to V1 to V8 (that is, the network nodes corresponding to the first adjacent objects of the target object) in FIG. 4b, $p_{v,h}^{(t-1)}$ denotes the probability that the object v is classified as the $h^{th}$ first relationship type at the $(t-1)^{th}$ iteration, $z_{u,h}$ denotes the implicit representation of the target object under the $h^{th}$ first relationship type, and $z_{v,h}$ denotes the implicit representation of the first adjacent objects of the target object under the $h^{th}$ first relationship type. An initial value $p_{v,h}^0$ of the probability that the object v is classified as the $h^{th}$ first relationship type is determined based on the quantity of the first relationship types. In one specific implementation, $$p_{v,h}^0 = \frac{1}{K}.$$

For example, assuming that the quantity of the first relationship types of an object A is 5 (that is, association relationships of the object A are divided into 5 categories), $$p_{v,h}^0 = \frac{1}{5}.$$

By performing an iterative operation based on Equation 3 and Equation 4 above, the intelligent device may determine the relationship feature information (the relationship feature information of each first relationship type at the $T^{th}$ iteration) of the K first relationship types. Through practice, by optimizing the probability that the object v is classified as the $h^{th}$ first relationship type through T iterations, the influence of different first relationship types on the object v may be distinguished, and the accuracy of multimedia resource recommendation may be improved.

S304: Perform feature analysis on the target object based on the K relationship feature information respectively corresponding to the K first relationship types, so as to obtain representation feature information of the target object.

In one implementation, the intelligent device determines the relationship feature information of each first relationship type at the $T^{th}$ iteration as the relationship feature information (e.g., $c_h=c_h^T$) of the first relationship type, so as to obtain the representation feature information $y_u=[c_1, c_2, \ldots, c_K]$ of the target object.

In another implementation, the intelligent device acquires a first feature information set of the first adjacent objects of the target object, and a second feature information set of second adjacent objects of the target object. The first feature information set includes relationship feature information (e.g., $[c_1', c_2', \ldots, c_R']$) corresponding to each second relationship type of a plurality of second relationship types of the first adjacent objects of the target object. The second feature information set includes relationship feature information (e.g., $[c_1'', c_2'', \ldots, c_s'']$) corresponding to each third relationship type of a plurality of third relationship types of the second adjacent objects of the target object. R and S are positive integers, and R, S and K may be the same or different. When R, S and K are the same, an object and first adjacent objects of the object are divided into K first relationship types. When R, S and K are different, an object and first adjacent objects of the object are divided into different quantities of first relationship types. The specific implementation of the intelligent device acquiring the first feature information set of the first adjacent objects of the target object and the second feature information set of the second adjacent objects of the target object may refer to operations S301 to S303. Representation feature information $y_v^1=[c_1', c_2', \ldots, c_R']$ of the first adjacent objects of the target object may be obtained through the first feature information set. Similarly, representation feature information $y_v^2=[c_1'', c_2'', \ldots, c_S'']$ of the second adjacent objects of the target object may be obtained through the second feature information set, and representation feature information $y_v^L$ of $L^{th}$ adjacent objects of the target object may be obtained through an $L^{th}$ feature information set.

By taking the relationship feature information corresponding to the K first relationship types of the target object as well as the first feature information set to the $L^{th}$ feature information set as an input of a relationship prediction model, a prediction result outputted by the relationship prediction model is obtained. The relationship prediction model includes L graph convolutional network layers, L being a positive integer. Overfitting processing is performed on the prediction result to obtain the representation feature information of the target object. In the relationship prediction model, input data of a $g^{th}$ graph convolutional network layer includes: data obtained by performing overfitting processing on output data of a $(g-1)^{th}$ graph convolutional network layer.

As an example, a processing result $y_u^{(l-1)}$ of the target object at an $(l-1)^{th}$ layer and a processing result set of the first adjacent objects of the target object at the $(l-1)^{th}$ layer are taken as an input of an $l^{th}$ layer of the relationship prediction model, l being a positive integer, being less than or equal to L. Processing the input data with the $l^{th}$ layer of the relationship prediction model may be expressed as:

$$f^{(l)}(y_u^{(l-1)}, \{y_v^{l-1}|(u,v)\in G\}) \quad \text{Equation 5.}$$

Then overfitting processing is performed on output data of the $l^{th}$ layer of the relationship prediction model to obtain a processing result $y_u^{(l)}$ of the target object at the $l^{th}$ layer:

$$y_u^{(l)}=\text{dropout}(f^{(l)}(y_u^{(l-1)}, \{y_v^{l-1}|(u,v)\in G\})) \quad \text{Equation 6,}$$

where $f^{(l)}(x)$ denotes to process x with the $l^{th}$ layer of the relationship prediction model, dropout(x) denotes to perform overfitting processing on x, and a value of $y_u^{(0)}$ is initialized to $x_u$. A processing result $y_u^{(L)}$ of the target object at an $L^{th}$ layer may be expressed as:

$$y_u^{(L)}=U_u=[c_{u,1}, c_{u,2}, \ldots, c_{u,K}] \quad \text{Equation 7.}$$

The difference between $U_u$ and is $y_u$ is that $y_u$ is obtained based on the representation vector of the target object and representation vectors of the first adjacent objects of the target object, while $U_u$ is obtained based on the representation vector of the target object and the representation vectors of the first adjacent objects to $L^{th}$ adjacent objects of the target object (that is, covering more feature information compared to $y_u$).

S305: Acquire a multimedia resource set, determine a first multimedia resource from the multimedia resource set, and transmit the first multimedia resource to the target object.

The first multimedia resource is one or more multimedia resources having a matching degree with the representation feature information of the target object higher than a matching degree threshold.

In one implementation, the multimedia resource set includes resource feature information of a plurality of multimedia resources. The intelligent device acquires viewing information of the multimedia resources, the viewing information including object identifiers of Q objects that have viewed the multimedia resources, Q being a positive integer; acquires representation vectors of the Q objects (for example, from the matrix X in operation S301) based on the object identifiers of the Q objects; and performs fusion processing on the representation vectors of the Q objects (for example, performing superposition on the representation vectors of the Q objects), and performs mean pooling processing on a result of the fusion processing to obtain the resource feature information of the multimedia resources. A list of objects that have viewed a multimedia resource is assumed to be (u1, u2, u3, u4, . . . , uH), and H is the total quantity of all objects that have viewed the multimedia resource. If the resource feature information of the multimedia resource is expressed as $i_m$, $$i_m = \frac{1}{H}\sum_{h=1}^{H} x_{u_h}, \quad \text{Equation 8}$$

where $x_{u_h}$ denotes a representation vector of an object $u_h$. Similarly, the intelligent device may obtain resource feature information of all multimedia resources in the multimedia resource set based on Equation 8 above, and the resource feature information may be recorded in a matrix I, where $I=\{i_1, i_2, \ldots, i_N\}$.

In some embodiments, the intelligent device determines, based on the representation feature information of the target object and the resource feature information of each multimedia resource in the multimedia resource set, a matching degree between the target object and each multimedia resource in the multimedia resource set.

In one implementation, the intelligent device may predict the relationship between each first relationship type and a multimedia resource i through a multi-layer perceptron (MLP), and then comprehensively consider preferences of the different first relationship types through an attention mechanism to finally obtain a prediction result of a target object u and the multimedia resource i.

The intelligent device concatenates the resource feature information of a multimedia resource in the multimedia resource set with the representation feature information of the target object to obtain a concatenated feature set (that is, concatenating the resource feature information of the multimedia resource and the relationship feature information corresponding to each first relationship type in $[c_{u,1}, c_{u,2}, \ldots, c_{u,K}]$ to obtain K concatenated features), and processes each concatenated feature in the concatenated feature set through the multi-layer perceptron to obtain a relationship vector between each first relationship type of the K first relationship types and the multimedia resource. The relationship vector between a $k^{th}$ first relationship type of the target object and the multimedia resource i may be expressed as:

$$r_{u,i,k} = MLP_1(c_{u,k} \| I_i) \quad \text{Equation 9,}$$

where $x \| y$ denotes to concatenate a vector x and a vector y, and $MLP_1(x)$ denotes to process x through a first multi-layer perceptron. Based on Equation 9 above, the intelligent device may process each concatenated feature in the concatenated feature set through the first multi-layer perceptron to obtain the relationship vector between each first relationship type and each multimedia resource.

After obtaining the relationship vector between each first relationship type and a multimedia resource, the intelligent device calculates a weight corresponding to the first relationship type based on the relationship vector between each first relationship type and the multimedia resource. The weight of the $k^{th}$ first relationship type of the target object and the multimedia resource i may be expressed as:

$$w_{u,i,k} = \frac{\exp(\sigma(a^T r_{u,i,k}))}{\sum_{k=1}^{K} \exp(\sigma(a^T r_{u,i,k}))}, \quad \text{Equation 10}$$

where the exponential function $\exp(x)$ denotes to calculate an exponent of x, $\sigma(x)$ is an activation function (such as a sigmoid function), $a^T$ denotes an attention vector, and $a^T r_{u,i,k}$ denotes to perform a point multiplication operation on the relationship vector and the attention vector. Based on Equation 10 above, the intelligent device may determine the weight between each first relationship type of the target object and each multimedia resource.

After obtaining the weight between each first relationship type of the target object and a multimedia resource in the multimedia resource set, the intelligent device obtains the matching degree between the target object and the multimedia resource based on the relationship vector between each first relationship type of the K first relationship types and the multimedia resource and the weight corresponding to each first relationship type. The matching degree between the target object and the multimedia resource i may be expressed as:

$$y_{u,i} = MLP_2\left(\sum_{k=1}^{K} w_{u,i,k} \cdot r_{u,i,k}\right), \quad \text{Equation 11}$$

where $MLP_2(x)$ denotes to process x through a second multi-layer perceptron. Based on Equation 11 above, the intelligent device may obtain the matching degree between the target object and each multimedia resource in the multimedia resource set through the second multi-layer perceptron.

According to some embodiments, the intelligent device ranks the multimedia resources in the multimedia resource set in an order of matching degree from high to low, determines one or more multimedia resources that are arranged before a target location and have a matching degree higher than the matching degree threshold as the first multimedia resource, and then recommends the first multimedia resource to the target object. According to some embodiments, the first multimedia resource is one or more multimedia resources, having the highest matching degree with the target object, in the multimedia resource set.

In another implementation, before making multimedia resource recommendation, the intelligent device may optimize the parameters in Equation 1 to Equation 11 with training data (that is, labeled data is compared to predicted data determined through Equation 1 to Equation 11, and the parameters in Equation 1 to Equation 11 are adjusted by the loss function to reduce the difference between the labeled data and the predicted data until the loss function converges). Upon completion of the training, the intelligent device acquires the representation vectors of all objects. When a multimedia resource acquisition request of the target object u is detected, the degree of similarity between the target object u and each multimedia resource in the multimedia resource set is compared by performing above-mentioned operations S301-S305, and then multimedia resources satisfying recommendation conditions are recommended to the target object.

According to some embodiments, as shown in FIG. 2, the association information network graph is constructed based on the association relationship information set, so as to obtain the representation vector of the target object and the adjacent object representation vector set; the relationship feature information corresponding to each first relationship type of the first relationship types is obtained based on the implicit representations of the target object and the first adjacent objects of the target object, so as to obtain the representation feature information of the target object; and the resource feature information of the multimedia resources is obtained based on the representation vectors of objects that have viewed the multimedia resources, and thus multimedia resources are recommended to the target object based on the representation feature information of the target object and the resource feature information of the multimedia resources. Thus, the interest points of the target object are mined based on the relationship types between the target object and the adjacent objects of the target object, and the accuracy of recommendation is improved.

The foregoing sets forth the methods according to some embodiments and, in order to facilitate better practice of the foregoing aspects of the embodiments, the following sets forth an apparatus according to the embodiments of the disclosure.

Figure 5:
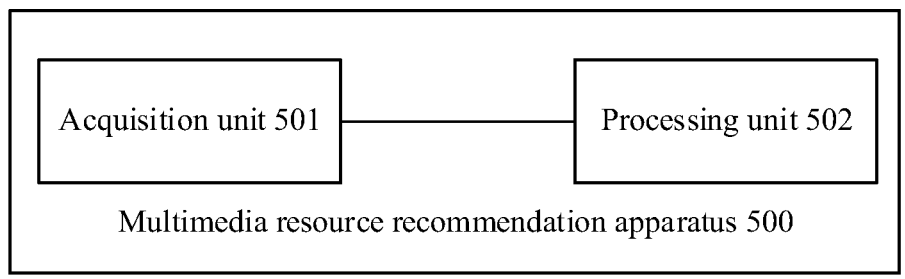
FIG. 5 is a schematic structural diagram of a multimedia resource recommendation apparatus according to some embodiments.

Referring to FIG. 5, which is a schematic structural diagram of a multimedia resource recommendation apparatus according to some embodiments, the multimedia resource recommendation apparatus 500 includes an acquisition unit 501 and a processing unit 502. The apparatus may be mounted on an intelligent device, and the intelligent device may include a terminal device and a server. The multimedia resource recommendation apparatus shown in FIG. 5 may be configured to perform some or all of the functions in the method embodiments described above in FIG. 2 and FIG. 3. The description of each unit is as follows:

The acquisition unit 501 is configured to acquire a representation vector of a target object and an adjacent object representation vector set, the adjacent object representation vector set including representation vectors of first adjacent objects of the target object, the target object and the first adjacent objects being divided into K first relationship types, K being a positive integer.

The processing unit 502 is configured to obtain, based on the representation vector of the target object and the adjacent object representation vector set, representation feature information of the target object, the representation feature information being determined based on relationship feature information corresponding to each first relationship type of the K first relationship types of the target object; and configured to acquire a multimedia resource set, determine, based on the representation feature information of the target object, a first multimedia resource from the multimedia resource set, and transmit the first multimedia resource to the target object, the first multimedia resource being one or more multimedia resources having a matching degree with the representation feature information of the target object higher than a matching degree threshold.

According to some embodiments, the processing unit 502 is further configured to: obtain, based on the representation vector of the target object and the adjacent object representation vector set, the relationship feature information corresponding to each first relationship type of the K first relationship types; and perform feature analysis on the target object based on K relationship feature information respectively corresponding to the K first relationship types, so as to obtain the representation feature information of the target object.

According to some embodiments, the processing unit 502 is further configured to: acquire a feature parameter set of an $h^{th}$ first relationship type of the K first relationship types, the feature parameter set including a weight matrix of the $h^{th}$ first relationship type and a bias vector of the $h^{th}$ first relationship type; determine, based on the feature parameter set of the $h^{th}$ first relationship type, a target object intermediate feature of the target object under the $h^{th}$ first relationship type, and determine an adjacent object intermediate feature of each first adjacent object of the target object under the $h^{th}$ first relationship type; and obtain, based on the target object intermediate feature and the adjacent object intermediate features, relationship feature information of the $h^{th}$ first relationship type.

According to some embodiments, the relationship feature information of the $h^{th}$ first relationship type is relationship feature information of the $h^{th}$ first relationship type at a $T^{th}$ iteration, T being a positive integer greater than 1. The processing unit 502 is further configured to: acquire a target probability that each first adjacent object of the target object is classified as the $h^{th}$ first relationship type at a $t^{th}$ iteration, t being a positive integer, t being less than T; determine, based on the target probability and the adjacent object intermediate features, aggregation features of the first adjacent objects of the target object; and perform operation processing on the target object intermediate feature and the aggregation features of the first adjacent objects of the target object to obtain relationship feature information of the $h^{th}$ first relationship type at a $(t+1)^{th}$ iteration.

According to some embodiments, the processing unit 502 is further configured to: acquire a first feature information set of the first adjacent objects of the target object and a second feature information set of second adjacent objects of the target object, the first feature information set including: relationship feature information corresponding to each second relationship type of a plurality of second relationship types of the first adjacent objects of the target object, the second feature information set including: relationship feature information corresponding to each third relationship type of a plurality of third relationship types of the second adjacent objects of the target object; perform prediction processing on the relationship feature information corresponding to the K first relationship types of the target object, the first feature information set and the second feature information set through a relationship prediction model to obtain a prediction result outputted by the relationship prediction model, the relationship prediction model including L graph convolutional network layers, L being a positive integer; and perform overfitting processing on the prediction result to obtain the representation feature information of the target object. In the relationship prediction model, input data of a $g^{th}$ graph convolutional network layer includes: data obtained by performing overfitting processing on output data of a $(g-1)^{th}$ graph convolutional network layer.

According to some embodiments, the processing unit 502 is further configured to: acquire viewing information of a second multimedia resource, the viewing information including object identifiers of Q objects that have viewed the second multimedia resource, Q being a positive integer;

acquire, based on the object identifiers of the Q objects, representation vectors of the Q objects; and perform fusion processing on the representation vectors of the Q objects, and perform mean pooling processing on a result of the fusion processing to obtain resource feature information of the second multimedia resource. The multimedia resource set includes the resource feature information of the second multimedia resource.

According to some embodiments, the processing unit 502 is further configured to: determine, based on the representation feature information of the target object and the resource feature information of each multimedia resource in the multimedia resource set, a matching degree between the target object and each multimedia resource in the multimedia resource set; and determine, from the multimedia resource set, a multimedia resource having a matching degree with the target object higher than the matching degree threshold as the first multimedia resource.

According to some embodiments, the processing unit 502 is further configured to: perform concatenation on the resource feature information of the second multimedia resource in the multimedia resource set and the representation feature information of the target object to obtain a concatenated feature set; process each concatenated feature in the concatenated feature set through a multi-layer perceptron to obtain a relationship vector between each first relationship type of the K first relationship types and the second multimedia resource; calculate, based on the relationship vector between each first relationship type and the second multimedia resource, a weight corresponding to the first relationship type; and obtain, based on the relationship vector between each first relationship type of the K first relationship types and the second multimedia resource and the weight corresponding to each first relationship type, a matching degree between the target object and the second multimedia resource.

According to some embodiments, the processing unit 502 is further configured to: acquire an association relationship information set, the association relationship information set including an object information set and a relationship information set; generate N network nodes based on the object information set, each network node of the N network nodes corresponding to an object, each network node carrying object information of the corresponding object, N being a positive integer; generate, in a case that the relationship information set indicates that an object corresponding to a first network node of the N network nodes and an object corresponding to a second network node have an interaction behavior, edge information of the first network node and the second network node based on the interaction behavior to obtain an association information network graph; and obtain, based on the association information network graph, representation vectors of N objects corresponding to the N network nodes.

According to some embodiments, an edge weight in the edge information of the first network node and the second network node includes: a weight determined based on an association degree between the first network node and the second network node. The edge weight is proportional to the association degree. The association degree is determined based on interaction information of the first network node and the second network node within a target period of time. The interaction information includes: at least one of the cumulative quantity of interactions, cumulative duration of interactions, frequency of interactions, and content of interactions.

According to some embodiments, the processing unit 502 is further configured to: perform, with a target network node corresponding to the target object as a starting point, random walk in the association information network graph to obtain M tracks, a stride of each track being P, M and P being positive integers; and obtain, based on object information carried in the M tracks, the representation vector of the target object. The probability of walking from an $i^{th}$ network node to a $j^{th}$ network node is proportional to a target edge weight, the target edge weight is an edge weight in edge information of the $i^{th}$ network node and the $j^{th}$ network node, where i and j are positive integers, i is not equal to j, and i and j are less than or equal to N.

According to some embodiments, some of the operations involved in the multimedia resource recommendation method shown in FIG. 2 and FIG. 3 may be performed by the units of the multimedia resource recommendation apparatus shown in FIG. 5. For example, operation S201 shown in FIG. 2 may be performed by the acquisition unit 501 shown in FIG. 5, and operations S202 and S203 may be performed by the processing unit 502 shown in FIG. 5. Operations S301 and S302 shown in FIG. 3 may be performed by the acquisition unit 501 shown in FIG. 5, and operations S303-S305 may be performed by the processing unit 502 shown in FIG. 5. The units in the multimedia resource recommendation apparatus shown in FIG. 5 may be separately or all combined into one or more additional units, or some unit(s) therein may also be divided into a plurality of units which are functionally smaller, which may implement the same operation without affecting the implementation of the technical effect of some embodiments. The above-mentioned units are divided on the basis of logical functions, and in practical applications, the functions of one unit may also be implemented by a plurality of units, or the functions of a plurality of units may be implemented by one unit. According to other embodiments, the multimedia resource recommendation apparatus may also include other units, and in practical applications, these functions may also be implemented with the assistance of other units, and may be implemented in cooperation of a plurality of units.

According to another embodiment, the multimedia resource recommendation apparatus as shown in FIG. 5 may be constructed and the multimedia resource recommendation method according to the embodiment may be implemented by running a computer program (including a program code) capable of performing the operations involved in the corresponding methods shown in FIG. 2 and FIG. 3 on a general-purpose computing apparatus, such as a computer, that includes a central processing unit (CPU), a random access memory (RAM), a read-only memory (ROM) and other processing elements and storage elements. The computer program may be recorded, for example, on a computer-readable recording medium, loaded into the above-mentioned computing apparatus via the computer-readable recording medium, and executed therein.

Based on the same inventive concept, the principles and advantages of solving the problems of the multimedia resource recommendation apparatus according to some embodiments are similar to the principles and advantages of solving the problems of the multimedia resource recommendation method according to the method embodiment, and reference may be made to the principles and advantages of the implementation of the method.

Figure 6:
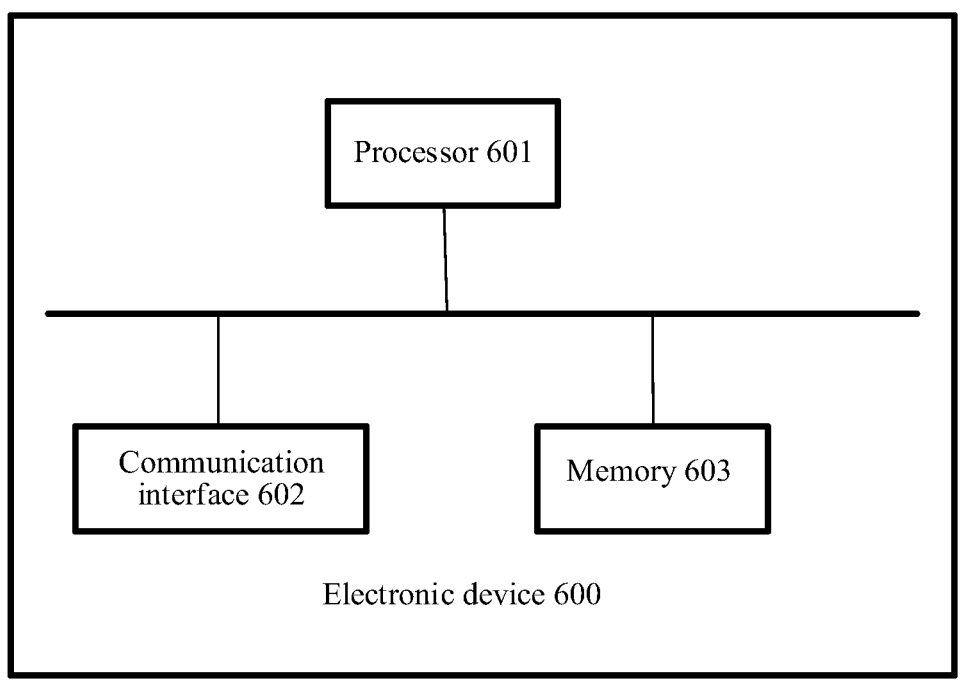
FIG. 6 is a schematic structural diagram of an electronic device according some embodiments.

Referring to FIG. 6, which is a schematic structural diagram of an electronic device according to some embodiments, the electronic device 600 includes at least a processor 601, a communication interface 602, and a memory 603. The processor 601, the communication interface 602, and the memory 603 may be connected by a bus or other means. According to some embodiments, the processor 601 is configured to perform the following operations by running an executable program code in the memory 603:

acquire a representation vector of a target object and an adjacent object representation vector set via the communication interface 602, the adjacent object representation vector set including representation vectors of first adjacent objects of the target object, the target object and the first adjacent objects being divided into K first relationship types, K being a positive integer;

obtain, based on the representation vector of the target object and the adjacent object representation vector set, representation feature information of the target object, the representation feature information being determined based on relationship feature information corresponding to each first relationship type of the K first relationship types of the target object; and acquire a multimedia resource set, determine, based on the representation feature information of the target object, a first multimedia resource from the multimedia resource set, and transmit the first multimedia resource to the target object, the first multimedia resource being one or more multimedia resources having a matching degree with the representation feature information of the target object higher than a matching degree threshold.

According to some embodiments, the specific embodiment that the processor 601 obtains, based on the representation vector of the target object and the adjacent object representation vector set, the representation feature information of the target object includes:

obtain, based on the representation vector of the target object and the adjacent object representation vector set, the relationship feature information corresponding to each first relationship type of the K first relationship types; and perform feature analysis on the target object based on K relationship feature information respectively corresponding to the K first relationship types, so as to obtain the representation feature information of the target object.

According to some embodiments, the specific embodiment that the processor 601 obtains based on the representation vector of the target object and the adjacent object representation vector set, the relationship feature information corresponding to each first relationship type of the K first relationship types includes:

acquire a feature parameter set of an $h^{th}$ first relationship type of the K first relationship types, the feature parameter set including a weight matrix of the $h^{th}$ first relationship type and a bias vector of the $h^{th}$ first relationship type;

determine, based on the feature parameter set of the $h^{th}$ first relationship type, a target object intermediate feature of the target object under the $h^{th}$ first relationship type, and determine an adjacent object intermediate feature of each first adjacent object of the target object under the $h^{th}$ first relationship type; and obtain, based on the target object intermediate feature and the adjacent object intermediate features, relationship feature information of the $h^{th}$ first relationship type.

According to some embodiments, the relationship feature information of the $h^{th}$ first relationship type is relationship feature information of the $h^{th}$ first relationship type at a Tt iteration, T being a positive integer greater than 1. The specific embodiment that the processor 601 obtains, based on the target object intermediate feature and the adjacent object intermediate features, relationship feature information of the $h^{th}$ first relationship type includes:

acquire a target probability that each first adjacent object of the target object is classified as the $h^{th}$ first relationship type at a $t^{th}$ iteration, t being a positive integer, t being less than T;

determine, based on the target probability and the adjacent object intermediate features, aggregation features of the first adjacent objects of the target object; and perform operation processing on the target object intermediate feature and the aggregation features of the first adjacent objects of the target object to obtain relationship feature information of the $h^{th}$ first relationship type at a $(t+1)^{th}$ iteration.

According to some embodiments, the specific embodiment that the processor 601 performs feature analysis on the target object based on K relationship feature information respectively corresponding to the K first relationship types, so as to obtain the representation feature information of the target object includes:

acquire a first feature information set of the first adjacent objects of the target object and a second feature information set of second adjacent objects of the target object, the first feature information set including: relationship feature information corresponding to each second relationship type of a plurality of second relationship types of the first adjacent objects of the target object, the second feature information set including: relationship feature information corresponding to each third relationship type of a plurality of third relationship types of the second adjacent objects of the target object;

perform prediction processing on the relationship feature information corresponding to the K first relationship types of the target object, the first feature information set and the second feature information set through a relationship prediction model to obtain a prediction result outputted by the relationship prediction model, the relationship prediction model including L graph convolutional network layers, L being a positive integer; and perform overfitting processing on the prediction result to obtain the representation feature information of the target object.

In the relationship prediction model, input data of a $g^{th}$ graph convolutional network layer includes: data obtained by performing overfitting processing on output data of a $(g-1)^{th}$ graph convolutional network layer.

According to some embodiments, the specific embodiment that the processor 601 obtains a multimedia resource set includes:

acquire viewing information of a second multimedia resource, the viewing information including object identifiers of Q objects that have viewed the second multimedia resource, Q being a positive integer;

acquire, based on the object identifiers of the Q objects, representation vectors of the Q objects; and perform fusion processing on the representation vectors of the Q objects, and perform mean pooling processing on a result of the fusion processing to obtain resource feature information of the second multimedia resource.

The multimedia resource set includes the resource feature information of the second multimedia resource.

According to some embodiments, the specific embodiment that the processor 601 determines, based on the representation feature information of the target object, a first multimedia resource from the multimedia resource set includes:

determine, based on the representation feature information of the target object and the resource feature information of each multimedia resource in the multimedia resource set, a matching degree between the target object and each multimedia resource in the multimedia resource set; and determine, from the multimedia resource set, a multimedia resource having a matching degree with the target object higher than the matching degree threshold as the first multimedia resource.

According to some embodiments, the specific embodiment that the processor 601 determines, based on the representation feature information of the target object and the resource feature information of each multimedia resource in the multimedia resource set, a matching degree between the target object and each multimedia resource in the multimedia resource set includes:

performing concatenation processing on the resource feature information of the second multimedia resource in the multimedia resource set and the representation feature information of the target object to obtain a concatenated feature set;

process each concatenated feature in the concatenated feature set through a multi-layer perceptron to obtain a relationship vector between each first relationship type of the K first relationship types and the second multimedia resource;

determine, based on the relationship vector between each first relationship type and the second multimedia resource, a weight corresponding to the first relationship type; and determine, based on the relationship vector between each first relationship type of the K first relationship types and the second multimedia resource and the weight corresponding to each first relationship type, a matching degree between the target object and the second multimedia resource.

According to some embodiments, the processor 601 also performs the following operations by running an executable program code in the memory 603:

acquire an association relationship information set, the association relationship information set including an object information set and a relationship information set;

generate N network nodes based on the object information set, each network node of the N network nodes corresponding to an object, each network node carrying object information of the corresponding object, N being a positive integer;

generate, in a case that the relationship information set indicates that an object corresponding to a first network node of the N network nodes and an object corresponding to a second network node have an interaction behavior, edge information of the first network node and the second network node based on the interaction behavior to obtain an association information network graph; and obtain, based on the association information network graph, representation vectors of N objects corresponding to the N network nodes.

According to some embodiments, an edge weight in the edge information of the first network node and second network node includes: a weight determined based on an association degree between the first network node and the second network node. The edge weight is proportional to the association degree. The association degree is determined based on interaction information of the first network node and the second network node within a target period of time. The interaction information includes: at least one of the cumulative quantity of interactions, cumulative duration of interactions, frequency of interactions, and content of interactions.

According to some embodiments, the specific embodiment that the processor 601 obtains, based on the association information network graph, representation vectors of N objects corresponding to the N network nodes includes:

perform, with a target network node corresponding to the target object as a starting point, random walk in the association information network graph to obtain M tracks, a stride of each track being P, M and P being positive integers; and obtain, based on object information carried in the M tracks, the representation vector of the target object.

The probability of walking from an $i^{th}$ network node to a $j^{th}$ network node is proportional to a target edge weight, and the target edge weight is an edge weight in edge information of the $i^{th}$ network node and the $j^{th}$ network node, where i and j are positive integers, i is not equal to j, and i and j are less than or equal to N.

Based on the same inventive concept, the principles and advantages of solving the problems of the electronic device according to some embodiments are similar to the principles and advantages of solving the problems of the multimedia resource recommendation method, and reference may be made to the principles and advantages of the implementation of the method.

Some embodiments further provides a computer-readable storage medium having one or more instructions stored thereon. The one or more instructions are adapted to be loaded by a processor and to execute the multimedia resource recommendation method according to the above-mentioned method embodiment.

Some embodiments further provide a computer program product including instructions which, when run on a computer, cause the computer to execute the multimedia resource recommendation method according to the above-mentioned method embodiment.

Some embodiments further provide a computer program product or computer program including computer instructions stored in a computer-readable storage medium. A processor of a computer device reads the computer instructions from the computer-readable storage medium, and executes the computer instructions to cause the computer device to execute the above multimedia resource recommendation method.

The operations in the method according to some embodiments of the disclosure may be adjusted in order, combined or deleted according to actual needs.

The modules in the apparatus may be combined, divided or deleted according to actual needs.

A person of ordinary skill in the art will appreciate that all or some of the operations in the methods of the above-mentioned embodiments may be performed by a program that instructs associated hardware. The program may be stored in a computer-readable storage medium which may include: flash disks, read-only memories (ROMs), random access memories (RAMs), disks or CD-ROMs, etc.

While the foregoing is directed to one exemplary embodiment of the disclosure, and is not intended to limit the scope of the disclosure. A person of ordinary skill in the art will appreciate that all or part of the process for implementing the above embodiments, and equivalent changes made in accordance with the claims, still fall within the scope of the present disclosure.

What is claimed is:

1. A multimedia resource recommendation method, performed by at least one processor, the method comprising:

acquiring a representation vector of a target object and an adjacent object representation vector set, the adjacent object representation vector set comprising representation vectors of first adjacent objects of the target object, the target object and the first adjacent objects being divided into K first relationship types, K being a positive integer;

determining, based on the representation vector of the target object and the adjacent object representation vector set, representation feature information of the target object, the representation feature information being determined based on relationship feature information corresponding to each first relationship type of the K first relationship types of the target object;

acquiring a multimedia resource set;

determining, based on the representation feature information of the target object, a first multimedia resource from the multimedia resource set comprising a video resource, an audio resource or an image resource; and transmitting information to a user terminal corresponding to the target object to cause the user terminal to display the first multimedia resource, the first multimedia resource being one or more multimedia resources having a matching degree with the representation feature information of the target object higher than a matching degree threshold, wherein the acquiring the representation vector of the target object and the adjacent object representation vector set comprises:

acquiring an association relationship information set, the association relationship information set comprising an object information set and a relationship information set;

generating N network nodes based on the object information set, each network node of the N network nodes corresponding to an object, each network node carrying object information of the corresponding object, N being a positive integer;
generating, in a case that the relationship information set indicates that an object corresponding to a first network node of the N network nodes and an object corresponding to a second network node have an interaction behavior, edge information of the first network node and the second network node based on the interaction behavior to obtain an association information network graph; and
determining, based on the association information network graph, representation vectors of N objects corresponding to the N network nodes, and
wherein the interaction behavior comprises at least one of instant messaging, file sharing, or picture sharing over a social platform,
wherein the determining the representation feature information of the target object comprises acquiring a second feature information set of second adjacent objects of the target object, wherein the first adjacent objects have an interaction behavior with the target object and the second adjacent objects, and wherein the second adjacent objects have an interaction behavior with the first adjacent objects, but the second adjacent objects do not have an interaction behavior with the target object.

2. The method according to claim 1, wherein the determining the representation feature information of the target object comprises:
determining, based on the representation vector of the target object and the adjacent object representation vector set, the relationship feature information corresponding to each first relationship type of the K first relationship types; and
performing feature analysis on the target object based on K relationship feature information respectively corresponding to the K first relationship types, to obtain the representation feature information of the target object.

3. The method according to claim 2, wherein the determining the relationship feature information:
acquiring a feature parameter set of an $h^{th}$ first relationship type of the K first relationship types, the feature parameter set comprising a weight matrix of the $h^{th}$ first relationship type and a bias vector of the $h^{th}$ first relationship type, h=1, 2, ..., K;
determining, based on the feature parameter set of the $h^{th}$ first relationship type, a target object intermediate feature of the target object under the $h^{th}$ first relationship type;
determining an adjacent object intermediate feature of each first adjacent object of the target object under the $h^{th}$ first relationship type; and
determining, based on the target object intermediate feature and the adjacent object intermediate features, relationship feature information of the $h^{th}$ first relationship type.

4. The method according to claim 3, wherein the relationship feature information of the $h^{th}$ first relationship type is relationship feature information of the $h^{th}$ first relationship type at a $T^{th}$ iteration, T being a positive integer greater than 1; and
the determining the relationship feature information of the $h^{th}$ first relationship type comprises:
acquiring a target probability that each first adjacent object of the target object is classified as the $h^{th}$ first relationship type at a $t^{th}$ iteration, t being a positive integer, t being less than T, t=1, 2, ..., (T−1);
determining, based on the target probability and the adjacent object intermediate features, aggregation features of the first adjacent objects of the target object; and
performing operation processing on the target object intermediate feature and the aggregation features of the first adjacent objects of the target object to obtain relationship feature information of the $h^{th}$ first relationship type at a $(t+1)^{th}$ iteration.

5. The method according to claim 2, wherein the second feature information set comprises: relationship feature information corresponding to each third relationship type of a plurality of third relationship types of the second adjacent objects of the target object, and
wherein the performing the feature analysis comprises:
acquiring a first feature information set of the first adjacent objects of the target object, the first feature information set comprising: relationship feature information corresponding to each second relationship type of a plurality of second relationship types of the first adjacent objects of the target object, the second feature information set comprising: relationship feature information corresponding to each third relationship type of a plurality of third relationship types of the second adjacent objects of the target object;
performing prediction processing on the relationship feature information corresponding to the K first relationship types of the target object, the first feature information set and the second feature information set through a relationship prediction model to obtain a prediction result outputted by the relationship prediction model, the relationship prediction model comprising L graph convolutional network layers, L being a positive integer greater than 1; and
performing overfitting processing on the prediction result to obtain the representation feature information of the target object, the relationship prediction model, input data of a $g^{th}$ graph convolutional network layer comprising: data obtained by performing overfitting processing on output data of a $(g−1)^{th}$ graph convolutional network layer.

6. The method according to claim 1, wherein the acquiring the multimedia resource set comprises:
acquiring viewing information of multimedia resources, the viewing information comprising object identifiers of Q objects that have viewed the multimedia resources, Q being a positive integer;
acquiring, based on the object identifiers of the Q objects, representation vectors of the Q objects;
performing fusion processing on the representation vectors of the Q objects and
performing mean pooling processing on a result of the fusion processing to obtain resource feature information of the multimedia resources, the multimedia resource set comprising the resource feature information of the multimedia resources.

7. The method according to claim 6, wherein the determining the first multimedia resource:
determining, based on the representation feature information of the target object and the resource feature information of each multimedia resource in the multimedia resource set, a matching degree between the target object and each multimedia resource in the multimedia resource set; and
determining, from the multimedia resource set, a multimedia resource having a matching degree with the target object higher than the matching degree threshold as the first multimedia resource.

8. The method according to claim 7, wherein the determining the matching degree comprises:
performing concatenation processing on resource feature information of a second multimedia resource in the multimedia resource set and the representation feature information of the target object to obtain a concatenated feature set;
processing each concatenated feature in the concatenated feature set through a multi-layer perceptron to obtain a relationship vector between each first relationship type of the K first relationship types and the second multimedia resource;
determining, based on the relationship vector between each first relationship type and the second multimedia resource, a weight corresponding to the first relationship type; and
determining, based on the relationship vector between each first relationship type of the K first relationship types and the second multimedia resource and the weight corresponding to each first relationship type, a matching degree between the target object and the second multimedia resource.

9. The method according to claim 1, wherein an edge weight in the edge information of the first network node and the second network node comprises: a weight determined based on an association degree between the first network node and the second network node, the edge weight being proportional to the association degree, the association degree being determined based on interaction information of the first network node and the second network node within a target period of time, the interaction information comprising: at least one of cumulative quantity of interactions, cumulative duration of interactions, frequency of interactions, and content of interactions.

10. The method according to claim 9, further comprising:
performing, with a target network node corresponding to the target object as a starting point, random walk in the association information network graph to obtain M tracks, a stride of each track being P, M and P being positive integers; and
determining, based on object information carried in the M tracks, the representation vector of the target object, a probability of walking from an $i^{th}$ network node to a $j^{th}$ network node being proportional to a target edge weight, the target edge weight being an edge weight in edge information of the $i^{th}$ network node and the $j^{th}$ network node, i and j being positive integers, i being not equal to j, and i and j being less than or equal to N.

11. A multimedia resource recommendation apparatus, comprising:
at least one memory configured to store program code; and
at least one processor configured to read the program code and operate as instructed by the program code, the program code comprising:
first acquiring code configured to cause the at least one processor to acquire a representation vector of a target object and an adjacent object representation vector set, the adjacent object representation vector set comprising representation vectors of first adjacent objects of the target object, the target object and the first adjacent objects being divided into K first relationship types, K being a positive integer; and
first processing code configured to cause the at least one processor to determine, based on the representation vector of the target object and the adjacent object representation vector set, representation feature information of the target object, the representation feature information being determined based on relationship feature information corresponding to each first relationship type of the K first relationship types of the target object;
second acquiring code configured to cause the at least one processor to acquire a multimedia resource set;
first determining code configured to cause the at least one processor to determine, based on the representation feature information of the target object, a first multimedia resource from the multimedia resource set comprising a video resource, an audio resource or an image resource; and
transmitting code configured to cause the at least one processor to transmit information to a user terminal corresponding to the target object to cause the user terminal to display the first multimedia resource, the first multimedia resource being one or more multimedia resources having a matching degree with the representation feature information of the target object higher than a matching degree threshold,
wherein the first acquiring code is configured to cause at least one of the at least one processor to:
acquire an association relationship information set, the association relationship information set comprising an object information set and a relationship information set;
generate N network nodes based on the object information set, each network node of the N network nodes corresponding to an object, each network node carrying object information of the corresponding object, N being a positive integer;
generate, in a case that the relationship information set indicates that an object corresponding to a first network node of the N network nodes and an object corresponding to a second network node have an interaction behavior, edge information of the first network node and the second network node based on the interaction behavior to obtain an association information network graph; and
determine, based on the association information network graph, representation vectors of N objects corresponding to the N network nodes, and
wherein the interaction behavior comprises at least one of instant messaging, file sharing, or picture sharing over a social platform,
wherein the first processing code is configured to cause at least one of the at least one processor to acquire a second feature information set of second adjacent objects of the target object, wherein the first adjacent objects have an interaction behavior with the target object and the second adjacent objects, and wherein the second adjacent objects have an interaction behavior with the first adjacent objects, but the second adjacent objects do not have an interaction behavior with the target object.

12. The apparatus according to claim 10, wherein the first processing code comprises:
second determining code configured to cause the at least one processor to determine, based on the representation vector of the target object and the adjacent object representation vector set, the relationship feature information corresponding to each first relationship type of the K first relationship types; and performing code configured to cause the at least one processor to perform feature analysis on the target object based on K relationship feature information respectively corresponding to the K first relationship types, to obtain the representation feature information of the target object.

13. The apparatus according to claim 12, wherein the second determining code comprises:
  third acquiring code configured to cause the at least one processor to acquire a feature parameter set of an $h^{th}$ first relationship type of the K first relationship types, the feature parameter set comprising a weight matrix of the $h^{th}$ first relationship type and a bias vector of the $h^{th}$ first relationship type, h=1, 2, . . . , K;
  third determining code configured to cause the at least one processor to determine, based on the feature parameter set of the $h^{th}$ first relationship type, a target object intermediate feature of the target object under the $h^{th}$ first relationship type;
  fourth determining code configured to cause the at least one processor to determine an adjacent object intermediate feature of each first adjacent object of the target object under the $h^{th}$ first relationship type; and
  fifth determining code configured to cause the at least one processor to determine, based on the target object intermediate feature and the adjacent object intermediate features, relationship feature information of the $h^{th}$ first relationship type.

14. The apparatus according to claim 13, wherein the fifth determining code comprises:
  fourth acquiring code configured to cause the at least one processor to acquire a target probability that each first adjacent object of the target object is classified as the $h^{th}$ first relationship type at a $t^{th}$ iteration, t being a positive integer, t being less than T, t=1, 2, . . . , (T−1);
  sixth determining code configured to cause the at least one processor to determine, based on the target probability and the adjacent object intermediate features, aggregation features of the first adjacent objects of the target object; and
  second processing code configured to cause the at least one processor to perform operation processing on the target object intermediate feature and the aggregation features of the first adjacent objects of the target object to obtain relationship feature information of the $h^{th}$ first relationship type at a $(t+1)^{th}$ iteration.

15. The apparatus according to claim 12, wherein the second feature information set comprises: relationship feature information corresponding to each third relationship type of a plurality of third relationship types of the second adjacent objects of the target object,
  wherein the performing code comprises:
    fifth acquiring code configured to cause the at least one processor to acquire a first feature information set of the first adjacent objects of the target object, the first feature information set comprising: relationship feature information corresponding to each second relationship type of a plurality of second relationship types of the first adjacent objects of the target object;
    predicting code configured to cause the at least one processor to performing prediction processing on the relationship feature information corresponding to the K first relationship types of the target object, the first feature information set and the second feature information set through a relationship prediction model to obtain a prediction result outputted by the relationship prediction model, the relationship prediction model comprising L graph convolutional network layers, L being a positive integer greater than 1; and
    third processing code configured to cause the at least one processor to perform overfitting processing on the prediction result to obtain the representation feature information of the target object, the relationship prediction model, input data of a $g^{th}$ graph convolutional network layer comprising: data obtained by performing overfitting processing on output data of a $(g-1)^{th}$ graph convolutional network layer.

16. The apparatus according to claim 11, wherein the second acquiring code comprises:
  sixth acquiring code configured to cause the at least one processor to acquire viewing information of multimedia resources, the viewing information comprising object identifiers of Q objects that have viewed the multimedia resources, Q being a positive integer;
  seventh acquiring code configured to cause the at least one processor to acquire, based on the object identifiers of the Q objects, representation vectors of the Q objects;
  fusing code configured to cause the at least one processor to performing fusion processing on the representation vectors of the Q objects, and
  pooling code configured to cause the at least one processor to perform mean pooling processing on a result of the fusion processing to obtain resource feature information of the multimedia resources, the multimedia resource set comprising the resource feature information of the multimedia resources.

17. The apparatus according to claim 16, wherein the first determining code comprises:
  seventh determining code configured to cause the at least one processor to determine, based on the representation feature information of the target object and the resource feature information of each multimedia resource in the multimedia resource set, a matching degree between the target object and each multimedia resource in the multimedia resource set; and
  eight determining code configured to cause the at least one processor to determine, from the multimedia resource set, a multimedia resource having a matching degree with the target object higher than the matching degree threshold as the first multimedia resource.

18. The apparatus according to claim 17, wherein the eight determining code comprises:
  fourth processing code configured to cause the at least one processor to perform concatenation processing on resource feature information of a second multimedia resource in the multimedia resource set and the representation feature information of the target object to obtain a concatenated feature set;
  fourth code configured to cause the at least one processor to process each concatenated feature in the concatenated feature set through a multi-layer perceptron to obtain a relationship vector between each first relationship type of the K first relationship types and the second multimedia resource;
  ninth determining code configured to cause the at least one processor to determine, based on the relationship vector between each first relationship type and the second multimedia resource, a weight corresponding to the first relationship type; and
  tenth determining code configured to cause the at least one processor to determine, based on the relationship vector between each first relationship type of the K first relationship types and the second multimedia resource and the weight corresponding to each first relationship type, a matching degree between the target object and the second multimedia resource.

19. A non-transitory computer-readable storage medium, storing a computer program that when executed by at least one processor causes the at least one processor to:
    acquire a representation vector of a target object and an adjacent object representation vector set, the adjacent object representation vector set comprising representation vectors of first adjacent objects of the target object, the target object and the first adjacent objects being divided into K first relationship types, K being a positive integer;
    determine, based on the representation vector of the target object and the adjacent object representation vector set, representation feature information of the target object, the representation feature information being determined based on relationship feature information corresponding to each first relationship type of the K first relationship types of the target object;
    acquire a multimedia resource set;
    determine, based on the representation feature information of the target object, a first multimedia resource from the multimedia resource set comprising a video resource, an audio resource or an image resource; and
    transmit information to a user terminal corresponding to the target object to cause the user terminal to display the first multimedia resource, the first multimedia resource being one or more multimedia resources having a matching degree with the representation feature information of the target object higher than a matching degree threshold,
    wherein the acquiring the representation vector of the target object and the adjacent object representation vector set comprises:
        acquiring an association relationship information set, the association relationship information set comprising an object information set and a relationship information set;
        generating N network nodes based on the object information set, each network node of the N network nodes corresponding to an object, each network node carrying object information of the corresponding object, N being a positive integer;
        generating, in a case that the relationship information set indicates that an object corresponding to a first network node of the N network nodes and an object corresponding to a second network node have an interaction behavior, edge information of the first network node and the second network node based on the interaction behavior to obtain an association information network graph; and
        determining, based on the association information network graph, representation vectors of N objects corresponding to the N network nodes, and
    wherein the interaction behavior comprises at least one of instant messaging, file sharing, or picture sharing over a social platform,
    wherein the determining the representation feature information of the target object comprises acquiring a second feature information set of second adjacent objects of the target object, wherein the first adjacent objects have an interaction behavior with the target object and the second adjacent objects, and wherein the second adjacent objects have an interaction behavior with the first adjacent objects, but the second adjacent objects do not have an interaction behavior with the target object.

* * * * *